US009971603B2

(12) United States Patent
Yasin et al.

(10) Patent No.: US 9,971,603 B2
(45) Date of Patent: May 15, 2018

(54) CAUSING AN INTERRUPT BASED ON EVENT COUNT

(71) Applicant: Intel Corporation, Santa Clara, CA (US)

(72) Inventors: Ahmad Yasin, Haifa (IL); Peggy J. Irelan, Chandler, AZ (US); Ofer Levy, Atlit (IL); Emile Ziedan, Yamma-Zimer (IL); Grant G. Zhou, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 15/438,679

(22) Filed: Feb. 21, 2017

(65) Prior Publication Data
US 2017/0262290 A1 Sep. 14, 2017

Related U.S. Application Data

(63) Continuation of application No. 13/991,878, filed as application No. PCT/US2011/067914 on Dec. 29, 2011, now Pat. No. 9,575,766.

(51) Int. Cl.
G06F 9/38 (2018.01)
G06F 11/34 (2006.01)

(52) U.S. Cl.
CPC ........ G06F 9/3861 (2013.01); G06F 11/3466 (2013.01); G06F 11/3476 (2013.01); G06F 2201/86 (2013.01); G06F 2201/88 (2013.01)

(58) Field of Classification Search
None
See application file for complete search history.

(56) References Cited

U.S. PATENT DOCUMENTS

| 5,675,729 | A | * | 10/1997 | Mehring | G06F 11/3409 714/37 |
| 5,752,062 | A | * | 5/1998 | Gover | G06F 11/3409 702/186 |
| 5,938,760 | A | | 8/1999 | Levine et al. | |
| 6,003,128 | A | | 12/1999 | Tran | |
| 6,112,317 | A | | 8/2000 | Berc et al. | |
| 6,356,615 | B1 | * | 3/2002 | Coon | G06F 11/3409 377/16 |
| 6,735,690 | B1 | | 5/2004 | Barry et al. | |

(Continued)

OTHER PUBLICATIONS

International Preliminary Report on Patentability for Application No. PCT/US2011/067914, dated Jul. 10, 2014, 6 pages.
International Search Report for Application No. PCT/US2011/067914, dated Sep. 17, 2012, 3 pages.
Non-Final Office Action from U.S. Appl. No. 13/991,878, dated Jun. 13, 2016, 9 pages.
Non-Final Office Action from U.S. Appl. No. 13/991,878, dated Oct. 8, 2015, 13 pages.

(Continued)

Primary Examiner — Eric Coleman
(74) Attorney, Agent, or Firm — Nicholson De Vos Webster & Elliott, LLP

(57) ABSTRACT

Some implementations provide techniques and arrangements for causing an interrupt in a processor in response to an occurrence of a number of events. A first event counter counts the occurrences of a type of event within the processor and outputs a signal to activate a second event counter in response to reaching a first predefined count. The second event counter counts the occurrences of the type of event within the processor and causes an interrupt of the processor in response to reaching a second predefined count.

20 Claims, 9 Drawing Sheets

(56) References Cited

U.S. PATENT DOCUMENTS

| | | | |
|---|---|---|---|
| 7,349,399 B1* | 3/2008 | Chen | H04L 49/90 |
| | | | 370/394 |
| 7,673,166 B2 | 3/2010 | Liu et al. | |
| 7,895,382 B2 | 2/2011 | Dewitt et al. | |
| 2005/0154811 A1 | 7/2005 | Dewitt et al. | |
| 2007/0028077 A1* | 2/2007 | Tamai | G06F 9/30181 |
| | | | 712/209 |
| 2008/0221708 A1 | 9/2008 | Oyama et al. | |
| 2009/0157359 A1* | 6/2009 | Chernoff | G06F 9/542 |
| | | | 702/186 |
| 2010/0115240 A1 | 5/2010 | Falik et al. | |
| 2011/0055838 A1* | 3/2011 | Moyes | G06F 9/4881 |
| | | | 718/102 |
| 2011/0161639 A1 | 6/2011 | Knauth et al. | |

OTHER PUBLICATIONS

Notice of Allowance from U.S. Appl. No. 13/991,878, dated Nov. 3, 2016, 3 pages.
Notice of Allowance from U.S. Appl. No. 13/991,878, dated Oct. 19, 2016, 5 pages.
Office Action and Taiwan Search Report from foreign counterpart Taiwan Patent Application No. 101149310, dated Sep. 30, 2014, 7 pages.
Written Opinion for Application No. PCT/US2011/067914, dated Sep. 17, 2012, 4 pages.

* cited by examiner

US 9,971,603 B2

CAUSING AN INTERRUPT BASED ON EVENT COUNT

CROSS-REFERENCE TO RELATED APPLICATIONS

The present patent application is a continuation application claiming priority from U.S. patent application Ser. No. 13/991,878, whose § 371(c) date is Jun. 5, 2013, and titled: "Causing an Interrupt Based on Event Count", which is a U.S. National Phase Application under 35 U.S.C. § 371 of International Application No. PCT/US2011/067914, filed Dec. 29, 2011, and titled: "Causing an Interrupt Based on Event Count", both of which are incorporated herein by reference in their entirety.

TECHNICAL FIELD

This disclosure relates to the technical field of microprocessors.

BACKGROUND ART

Optimizing an application's overall performance on a given processor micro-architecture can be difficult. Challenges include ever-growing processor micro-architecture complexity, workload diversity, and a large volume of data produced by performance tools. Typical processors may include functionality to provide performance data, such as by counting the occurrence of micro-architectural events to characterize and profile the performance of application code. However, the functionality provided by some processors may be inadequate to provide accurate event data for some types of events that occur relatively frequently such that information relating to the events has a relatively short life span in the processor. For instance, with respect to instruction retired events and branch retired events as several nonlimiting examples, a delay between the occurrence of the event and recording of the state of the processor may result in the event being attributed to a section of application code occurring multiple cycles after the section of code that actually corresponded to the event.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Overview

Figure 1:
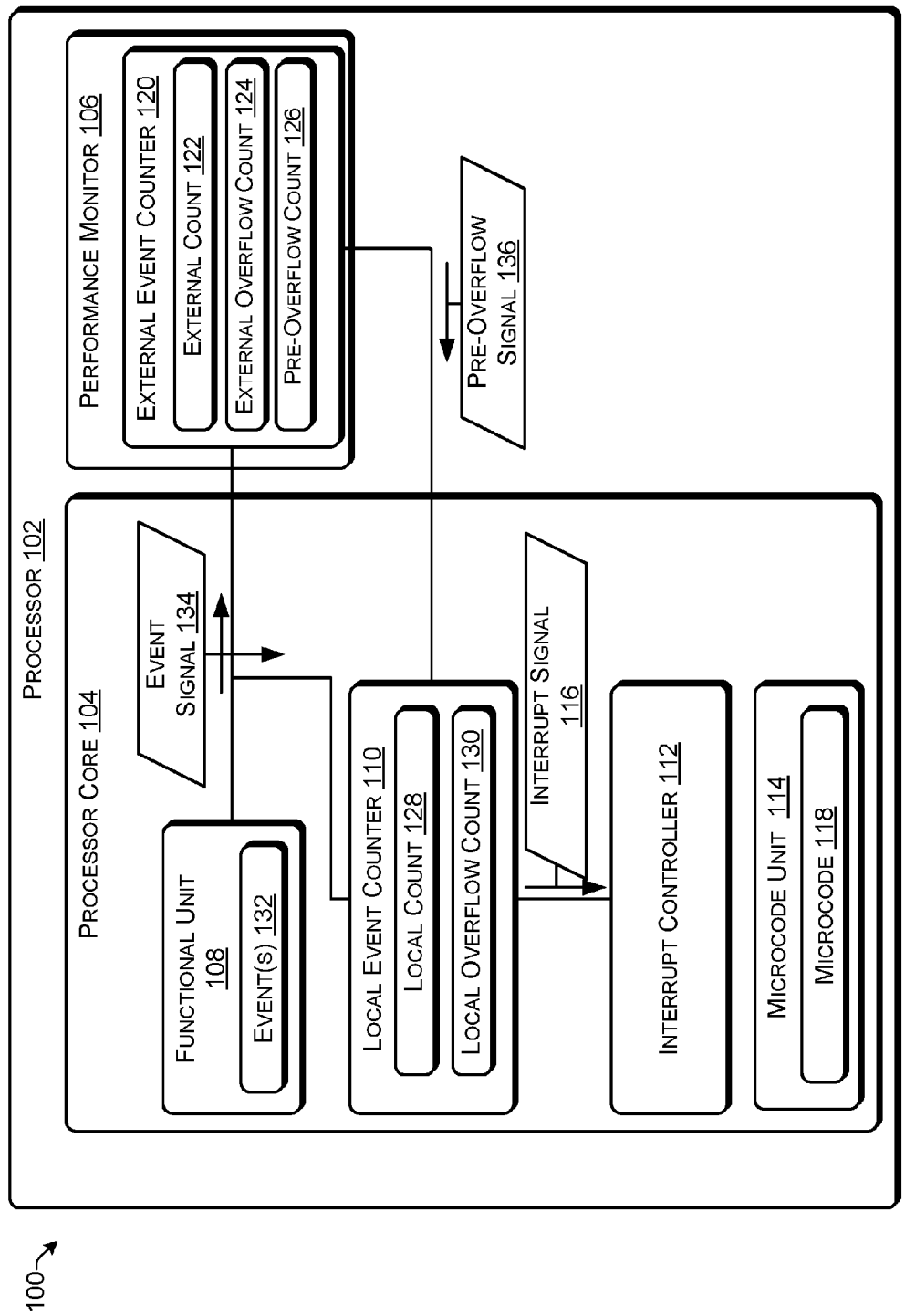
FIG. 1 illustrates select components of a processor architecture according to some implementations.

This disclosure includes techniques and arrangements for performance monitoring, such as for providing accurate performance monitoring for events. As used herein, events include, but are not limited to, micro-architectural events that occur relatively frequently within an processor such that information relating to the events has a relatively short life span in the processor. Non-limiting examples of types of events include instruction retired, branch retired, memory load retired, memory store retired, microoperation retired, cache miss, data translation look-aside buffer miss, segmentation conflict, floating point replay, memory order buffer load replay, segmentation and address translation replay, address generator unit and cache miss, data cache address and control replay, source dependency replay, misprediction, instruction tagging, writeback conflict, de-pipeline conflict, execution unit jump, control register access, or store forwarding guard events.

In some implementations discussed herein, event counters operate to count events that occur in the processor. Upon receiving an event signal, an event counter increments its event count. In some implementations, when the event counter reaches a predefined maximum count, the event counter is said to be armed. When the next event signal is received (i.e. maximum count plus one), the event counter is said to overflow or be in an overflow state. In other implementations, the event counter may overflow when reaching the predefined maximum count. The predefined maximum count may be a maximum count allowed by the number of bits of the individual event counter or may be a pre-defined overflow count less than the maximum count allowed by the number of bits of the event counter. As used herein, an overflow count and overflow state of an event counter is not limited to any one of these implementations. Depending on the implementation, when an event counter overflows, program execution in the processor may be interrupted. The interrupt may cause the execution of microcode that collects information about the state of the processor at the time execution is interrupted, e.g. an instruction pointer. Some event counters may also output a pre-overflow signal that indicates that the event counter is nearing an overflow state or count.

Processor architectures of some implementations may include a processor that includes at least a processor core and a performance monitor. The performance monitor may include an event counter. The example processors illustrated in the figures are illustrated as single core processors. However, the processors have been shown as such for ease of illustration and implementations herein may include multiple cores in which each core replicates the functionality described herein or in which the functionality described herein is centralized and shared amongst the processor cores. In addition, some implementations described herein illustrate the performance monitor as being external to the processor core. Such illustrations of the performance monitor are for ease of illustration and should not be taken as a limitation as the performance monitor may be a part of a processor core and, indeed, each processor core of a multi-core processor may have a dedicated performance monitor. Further, the terms "processor core" and "interrupt" as used herein should be taken in their broadest meaning and not as limited to any proprietary or specific definition. For example, the term "interrupt" is often used separately from the terms trap, exception and fault. Herein, the term interrupt is inclusive and may include an instruction that interrupts program execution. Additionally, the terms "instructions" and "operations" are used in their generic form and are inclusive of different levels of instructions and operations such as "microinstructions" and "microoperations" as well as "macroinstructions" and "macrooperations." Similarly, while implementations discussed herein are described as involving microcode, implementations are not so limited and may include non-microcode implementations.

In some implementations, the processor includes a second event counter. The second event counter may have fewer bits than an event counter of a performance monitor. Further, the additional event counter may be a part of the processor core, a part of a component of the processor core or located closer to the source of an event signal within the processor core than the event counter of the performance monitor. In the following discussions, the additional event counter may be referred to as a local counter and the event counter of the performance monitor may be referred to as an external event counter.

Example Implementations

FIG. 1 illustrates an example implementation including such a local event counter. The processor architecture 100 includes processor 102 including a processor core 104 and a performance monitor 106. Processor core 104 includes a functional unit 108, a local event counter 110, an interrupt controller 112 and a microcode unit 114.

The functional unit 108 may be any component of the processor core 104 in which events to be monitored occur. Non-limiting examples of functional units include reorder buffer units, retirement units, memory order buffers, fetch and decode units, memory, level 0 cache, level 1 cache, execution units, and translation look-aside buffers.

When activated by an interrupt signal 116, the interrupt controller 112 interrupts program execution by the processor 102 or processor core 104 it is associated with and causes the processor 102 to execute microcode 118 stored in microcode unit 114 to handle the interrupt specified by the activating interrupt signal 116. While the interrupt controller 112 is illustrated in some implementations herein as a discrete component of processor core 104, in other implementations, the functionality provided by the interrupt controller 112 may be incorporated into another component or shared among several other components.

In the illustrated example, the processor 102 includes the local event counter 110 and an external event counter 120. The external event counter 120 may be maintained by the performance monitor 106, and may include an external count 122, and external overflow count 124 and a pre-overflow count 126 in some implementations. Further, the local event counter 110 has a local count 128 and a local overflow count 130. As discussed above, these counts, 124, 126, 130 may be static or programmable.

In operation, when an event 132 occurs, the functional unit 108 outputs an event signal 134 to the external event counter 120 of the performance monitor 106. Upon receiving the event signal 134, the external event counter 120 increments its external event count 122. Upon reaching the pre-overflow count 126, the external event counter 120 outputs a pre-overflow signal 136. In response to the pre-overflow signal 136, the local event counter 110 is enabled. Once enabled, upon receiving event signal 134 corresponding to subsequent events 132, the local event counter 110 increments local event count 128. In some implementations, the local event counter 110 is synchronized with the external event counter 120 such that the event 132 that overflows the local event counter 110 is also the event that results in the external event counter 106 overflowing. For example, this can be done programmably by setting the values of the local count 128 and/or local overflow count 130 as necessary when the local event counter 110 is enabled. When the local event counter 110 reaches an overflow state, the local event counter 110 outputs an interrupt signal 116 to interrupt controller 112. In response to the interrupt signal 116, the interrupt controller 112 interrupts the execution of program instructions by the processor core 104 and causes the execution of microcode 118 in the microcode unit 114 that saves information about the state of the processor at the time execution is interrupted.

Figure 2:
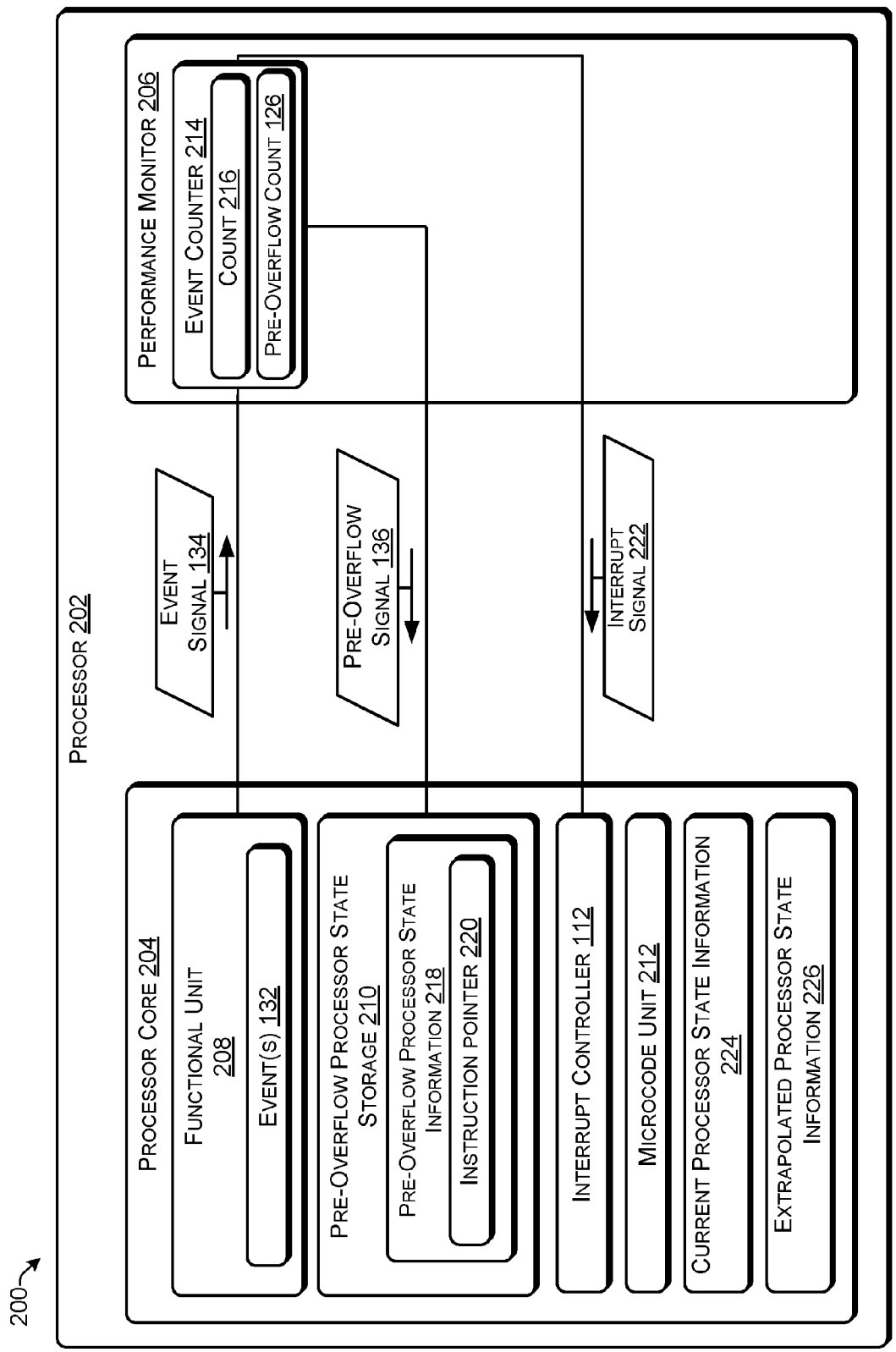
FIG. 2 illustrates select components of a processor architecture according to some implementations.

FIG. 2 illustrates an example implementation of a processor architecture 200 in which a processor 202 has a component that stores an indication of the contents of a processor core 204 prior to the overflow of an event counter. The processor architecture 200 includes processor 202 comprising a processor core 204 and a performance monitor 206. As shown in FIG. 2, processor core 204 includes a functional unit 208, pre-overflow processor state storage 210, interrupt controller 112 and microcode unit 212. The performance monitor 206 includes event counter 214 which corresponds to external event counter 120 except as discussed below.

When an event 132 occurs, the functional unit 208 outputs an event signal 134 to the event counter 214 of the performance monitor 206. Upon receiving the event signal 134, the event counter 214 increments its event count 216. Upon reaching the pre-overflow count 126, the event counter 214 outputs a pre-overflow signal 136 that causes the storage of pre-overflow processor state information 218 in pre-overflow processor state storage 210. Herein, processor state information may include any information regarding the state of the processor 202, such as an instruction pointer 220. The event counter 214 continues to count the events 122 until it reaches an overflow state. Upon reaching the overflow state, the event counter 214 outputs an interrupt signal 222 to interrupt controller 112. In response to interrupt signal 222, the interrupt controller 112 causes the execution of microcode stored in microcode unit 212 that collects current processor state information 224 and then uses the stored pre-overflow processor state information 218 and current processor state information 224 to extrapolate information 226 about the state of the processor at the time of the occurrence of the event that caused the event counter 214 to overflow.

The following example implementations are described in the context of particular types of events and functional units, such as instructions retired and retirement units. However, the implementations herein are not limited to the particular examples provided, and may be extended to other types of events, as will be apparent to those of skill in the art in light of the disclosure herein. Additionally, the example processor architectures shown in FIGS. 3, 5 and 7 do not illustrate any particular component specifically as part of a processor core. As discussed above, each illustrated component may or may not be a component of a processor core, and indeed, in a multi-core processor, each core may have a dedicated instance of one or more of the illustrated components.

Figure 3:
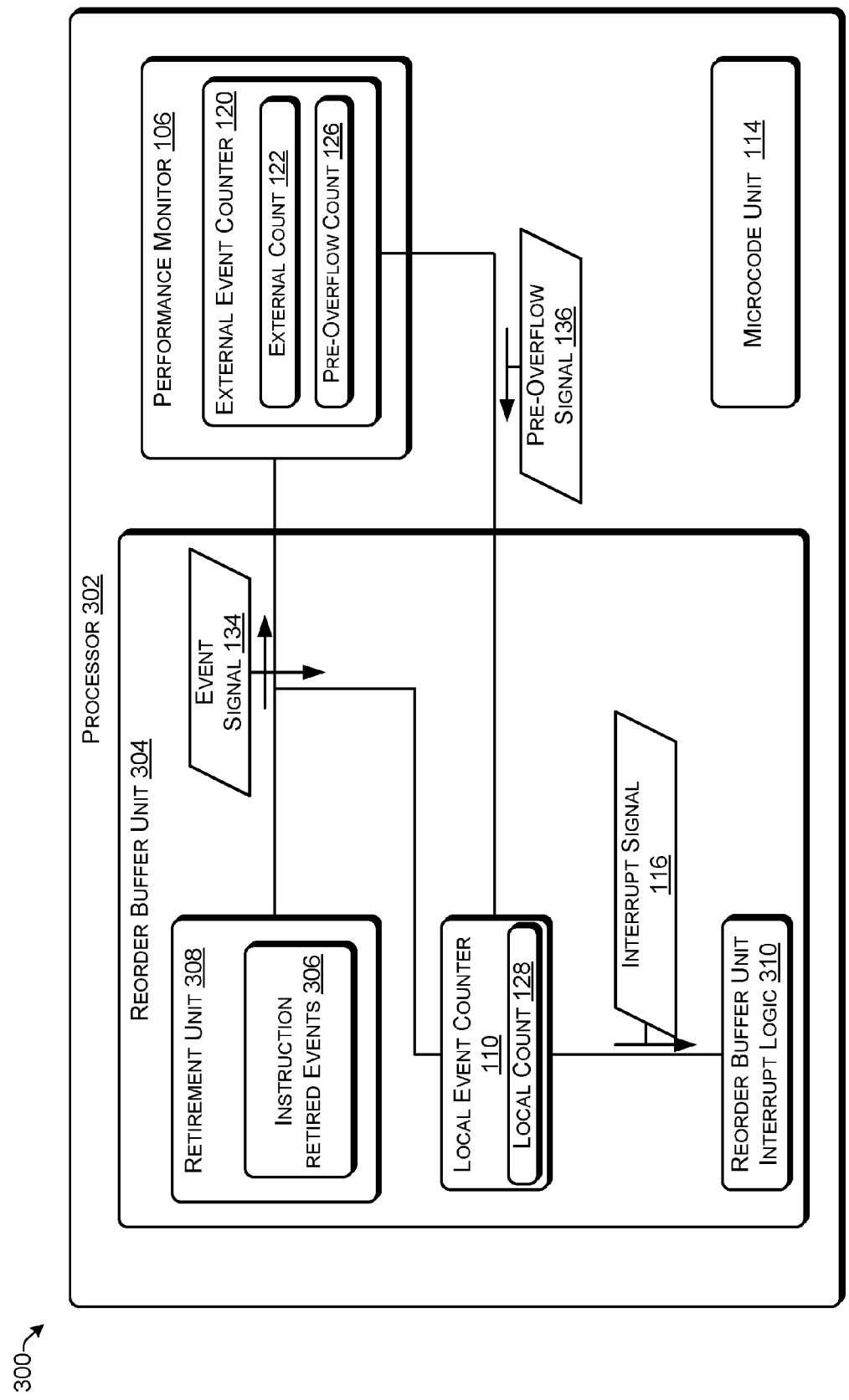
FIG. 3 illustrates select components of a processor architecture according to some implementations.

FIG. 3 illustrates select components of an example processor architecture 300. The example processor architecture 300 includes a processor 302 including the performance monitor 106, the microcode unit 114 and a reorder buffer unit 304. Example processor architecture 300 is similar to processor architecture 100 but is specifically directed to an implementation in which the events 132 are instruction retired events 306 and the functional unit 108 is a retirement unit 308.

In some implementations, the reorder buffer unit 304 is a unit in an out-of-order processor which includes logic that buffers completed instructions and updates the architectural state in the original program order. In general, the architectural state is the state of the process and can include data held in control registers or general purpose registers in some implementations. The reorder buffer unit 304 comprises the retirement unit 308, the local event counter 110, and reorder buffer unit interrupt logic 310. The reorder buffer unit 304 receives the results of executed instructions from an out-of-order execution pipeline (not shown in FIG. 3) and the retirement unit 308 processes the results so that the architectural state updates according to the original program order. An instruction is retired after it and all previous instructions are completed successfully and have written their results. In the implementation shown in FIG. 3, the reorder buffer unit 304 includes reorder buffer unit interrupt logic 310 which handles interrupt signals from the local event counter 110 directly in the reorder buffer unit 304. It operates in a similar manner to that discussed above with respect to interrupt controller 112. Further explanation of the interaction of elements of FIG. 3 will be provided with respect to FIG. 4.

Figure 4:
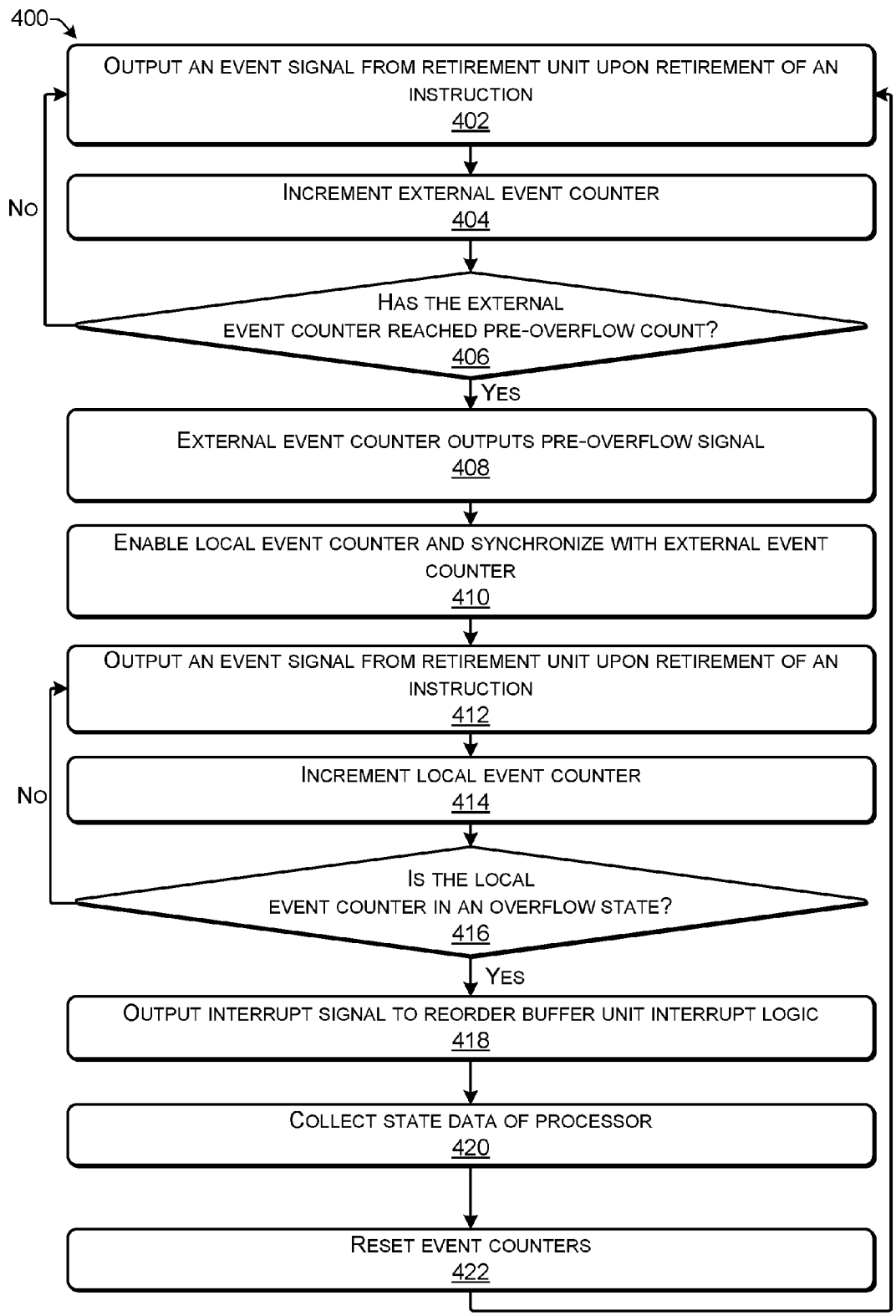
FIG. 4 illustrates an example process flow according to some implementations.

FIG. 4 illustrates an example flow diagram of an example process 400 for collecting state data of a processor according to some implementations. For discussion purposes, the process is described with reference to the processor 302 of FIG. 3, although the process 400 may be implemented using a wide variety of other processors, architectures, systems and environments.

At 402, when an instruction is retired 306, the retirement unit 308 outputs an event signal 134. At 404, the external event counter 120 of the performance monitor 106 increments its external event count 122. At 406, it is determined if the external event counter 120 has reached a pre-overflow event count 126. If not, the process flow returns to 402. If the external event counter 120 has reached a pre-overflow event count 126, at 408, the external event counter 120 outputs a pre-overflow signal 136. At 410, in response to the pre-overflow signal 136, the local event counter 110 is enabled and synchronized with the external event counter 120 such that the instruction retired event 306 that will result in the overflow of the external event counter 120 will overflow the local event counter 110.

At 412, when an instruction is retired 306, the retirement unit 308 outputs an event signal 134. At 414, the local event counter 110 receives the event signal 134 and increments its local count 128. At 416, it is determined if the local event counter 110 has overflowed. If not, the process flow returns to 412. If the local event counter 110 has overflowed, at 418, the local event counter 110 outputs an interrupt signal 116 to the reorder buffer unit interrupt logic 310. At 420, in response to the interrupt signal 116, reorder buffer unit interrupt logic 310 interrupts the execution of program instructions by the processor 302 and causes the execution of microcode instructions stored in microcode unit 114 that collect and store state information of processor 302 at the time the program execution was interrupted. After the state information is collected and stored, at 422, the event counters are reset and program execution resumes.

Figure 5:
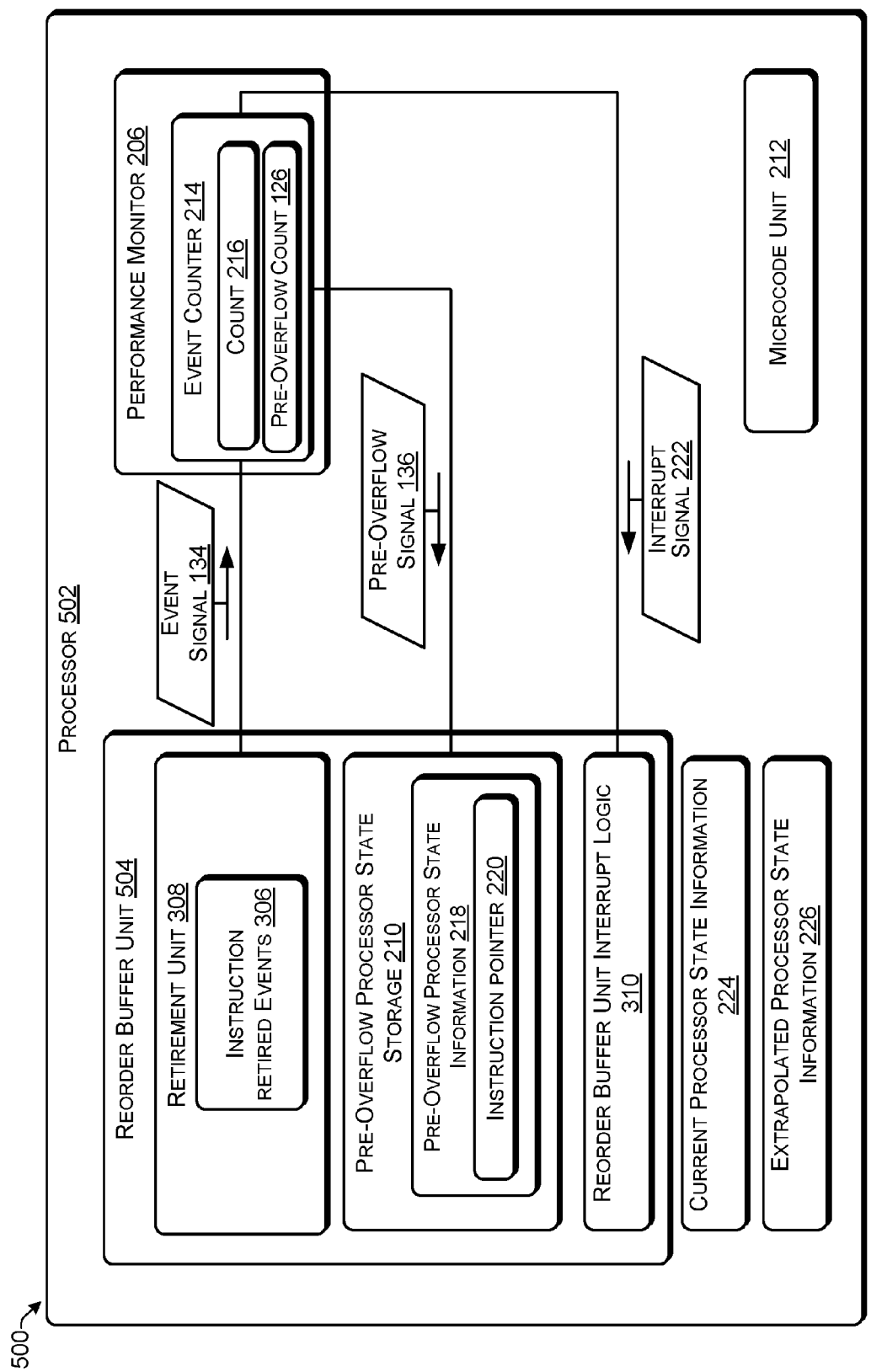
FIG. 5 illustrates select components of a processor architecture according to some implementations.

FIG. 5 illustrates select components of an example processor architecture 500. Example processor architecture 500 is similar to processor architecture 200 but is specifically directed to an implementation in which the events are instruction retired events 306 and the functional unit 208 is a retirement unit 308. Processor architecture 500 includes a processor 502 including the performance monitor 206, the microcode unit 212 and a reorder buffer unit 504. The reorder buffer unit 504 includes the retirement unit 308, the reorder buffer unit interrupt logic 310 and the pre-overflow processor state storage 210, as described above. Details of the relationships between components of FIG. 5 will be discussed with respect to the process flow shown in FIG. 6.

Figure 6:
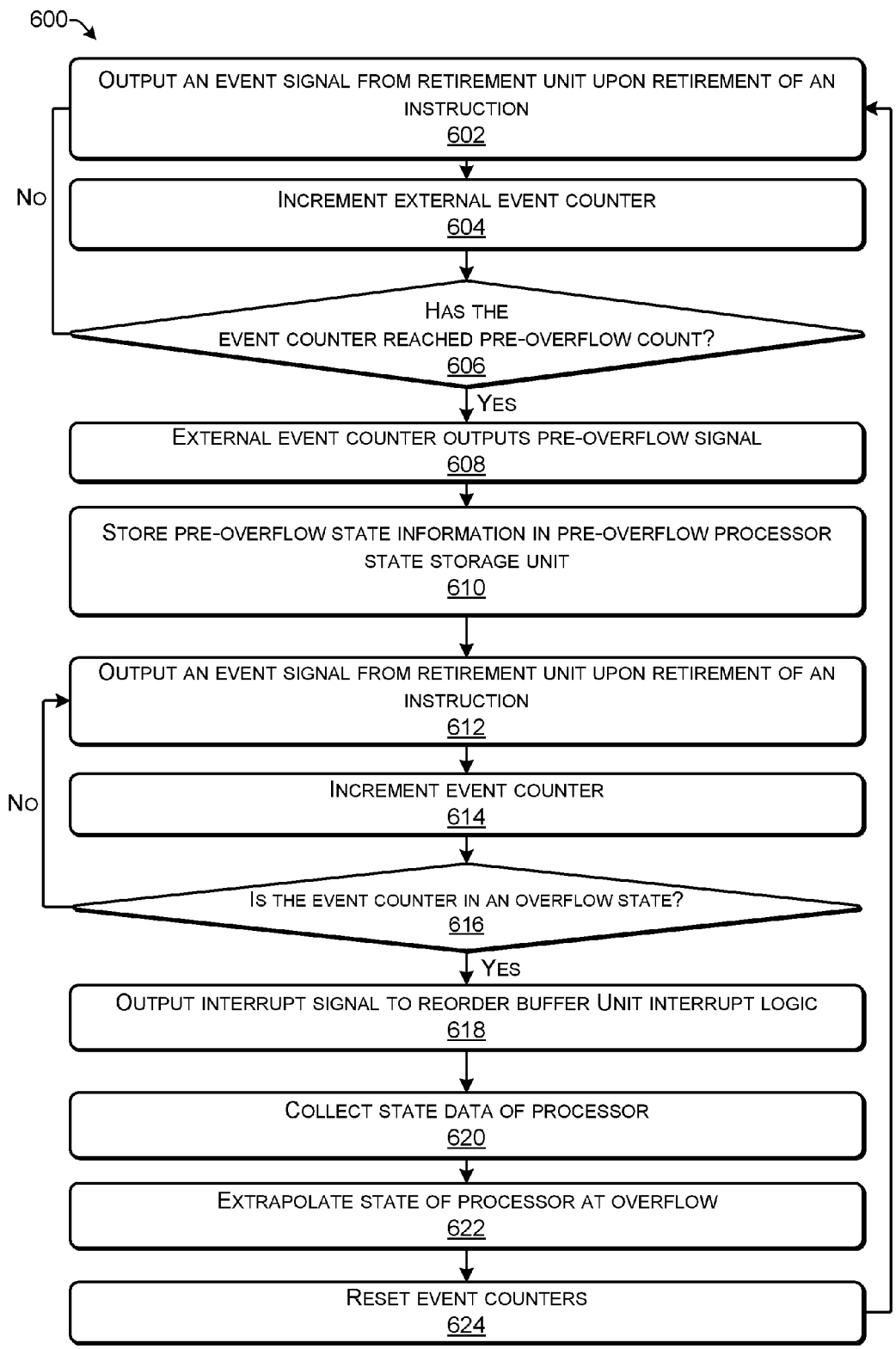
FIG. 6 illustrates an example process flow according to some implementations.

FIG. 6 illustrates an example flow diagram of an example process 600 for collecting state data of a processor according to some implementations. For discussion purposes, the process is described with reference to the processor 502 of FIG. 5, although the process 600 may be implemented using a wide variety of other processors, architectures, systems and environments.

At 602, when an instruction is retired 306, the retirement unit 308 outputs an event signal 134. At 604, the event counter 214 of the performance monitor 206 receives the event signal 134 and increments its event count 216. At 606, it is determined if the event counter 214 has reached a pre-overflow event count 126. If not, the process flow returns to 602. If the event counter 214 has reached a pre-overflow event count 126, at 608, the external event counter 214 outputs a pre-overflow signal 136. At 610, in response to the pre-overflow signal 136, pre-overflow processor state information 218 is stored in pre-overflow processor state storage 210 for use in extrapolating the state of the processor 502 when a subsequent instruction retired event 306 causes an overflow of event counter 214. The stored pre-overflow processor state information 218 may be a complete record of the state of the processor at the time the pre-overflow signal 136 is received or may be a partial record that includes particular information such as an instruction pointer 220. The amount and type of processor state information that is stored in response to the pre-overflow signal 136 is dependent on the particular technique used to extrapolate the processor state at overflow. The various techniques that can be used to extrapolate the processor state will not be described herein as such techniques are numerous and will be apparent to those of skill in the art in light of the disclosure herein. Further, while this example implementation is described as storing pre-overflow processor state information 218, other information could be stored in response to the pre-overflow signal 136. For example, the pre-overflow processor state storage 210 could store the instruction pointer of each instruction that is retired after receiving the pre-overflow signal 136 and prior to the interruption of processor 502 by the overflow of event counter 214.

At 612, when an instruction is retired, the retirement unit 308 outputs an event signal 134. At 614, the event counter 214 receives the event signal 134 and increments its event count 216. At 616, it is determined if the event counter 214 has overflowed. If not, the process flow returns to 612. If the event counter 214 has overflowed, at 618, the event counter 214 outputs interrupt signal 222 to reorder buffer unit interrupt logic 310. At 620, in response to the interrupt signal 222, reorder buffer unit interrupt logic 310 interrupts the execution of program instructions by the processor 502 and causes the execution of microcode instructions stored in microcode unit 212 that collect and store state information 224 of processor 502 at the time the program execution is interrupted. After the processor state information 224 is collected and stored, at 622, microcode instructions stored in the microcode unit 212 are executed to extrapolate the state of the processor 502 at the time the instruction retired event that caused the overflow occurred. The extrapolation is based, at least in part on the pre-overflow processor state information 218 and processor state information at the time program execution is interrupted 224. At 624, the extrapolated processor state information 226 is stored, the event counter is reset and program execution resumes.

Figure 7:
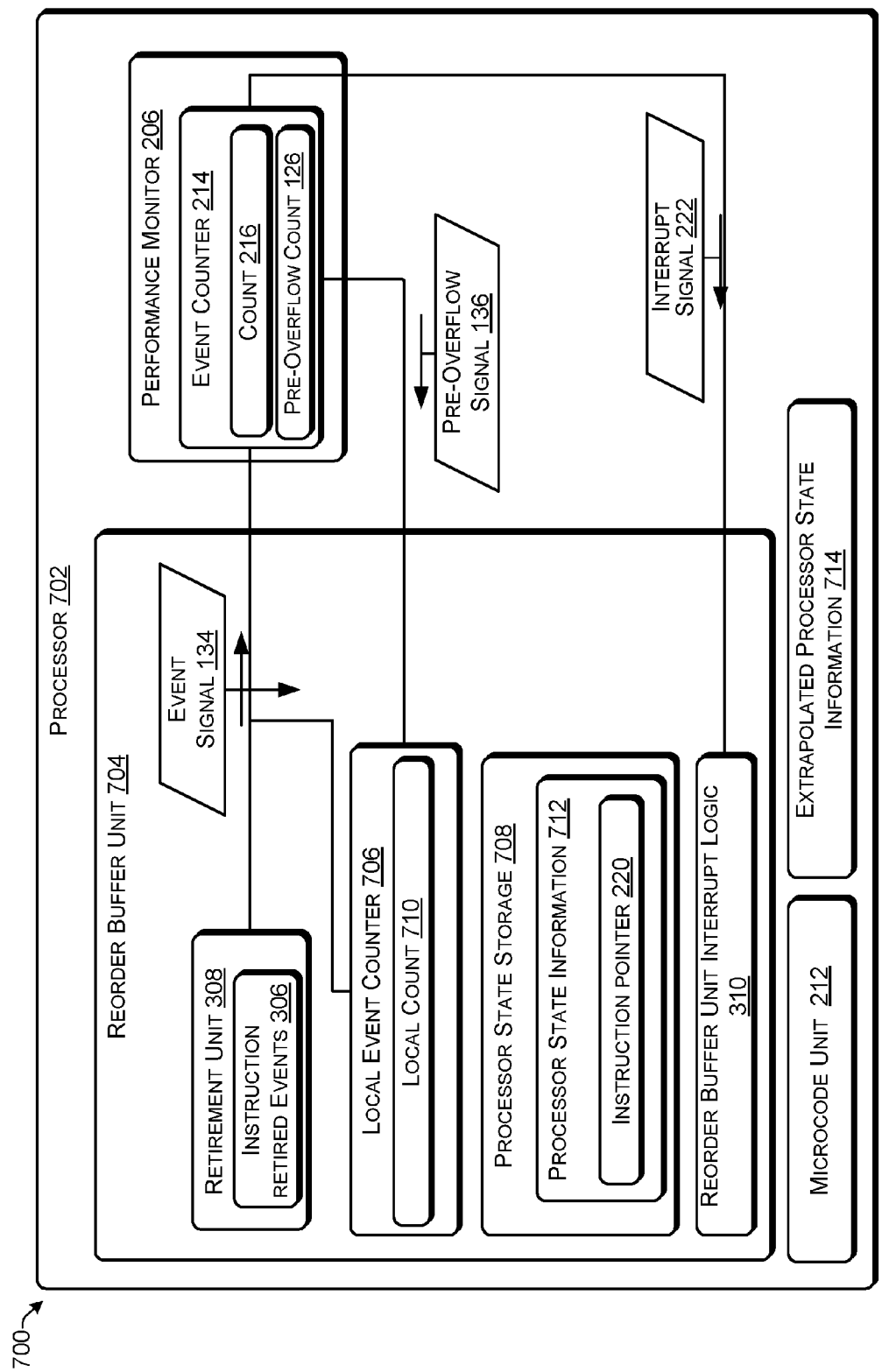
FIG. 7 illustrates select components of a processor architecture according to some implementations.

FIG. 7 illustrates select components of an alternate example processor architecture 700 incorporating components similar to processor architecture 300 and processor architecture 500. As shown in FIG. 7, processor architecture 700 includes a processor 702 that includes a reorder buffer unit 704, the performance monitor 206, and the microcode unit 212. The reorder buffer unit 704 includes the retirement unit 308, a local event counter 706, a processor state storage 708 and the reorder buffer unit interrupt logic 310.

Figure 8:
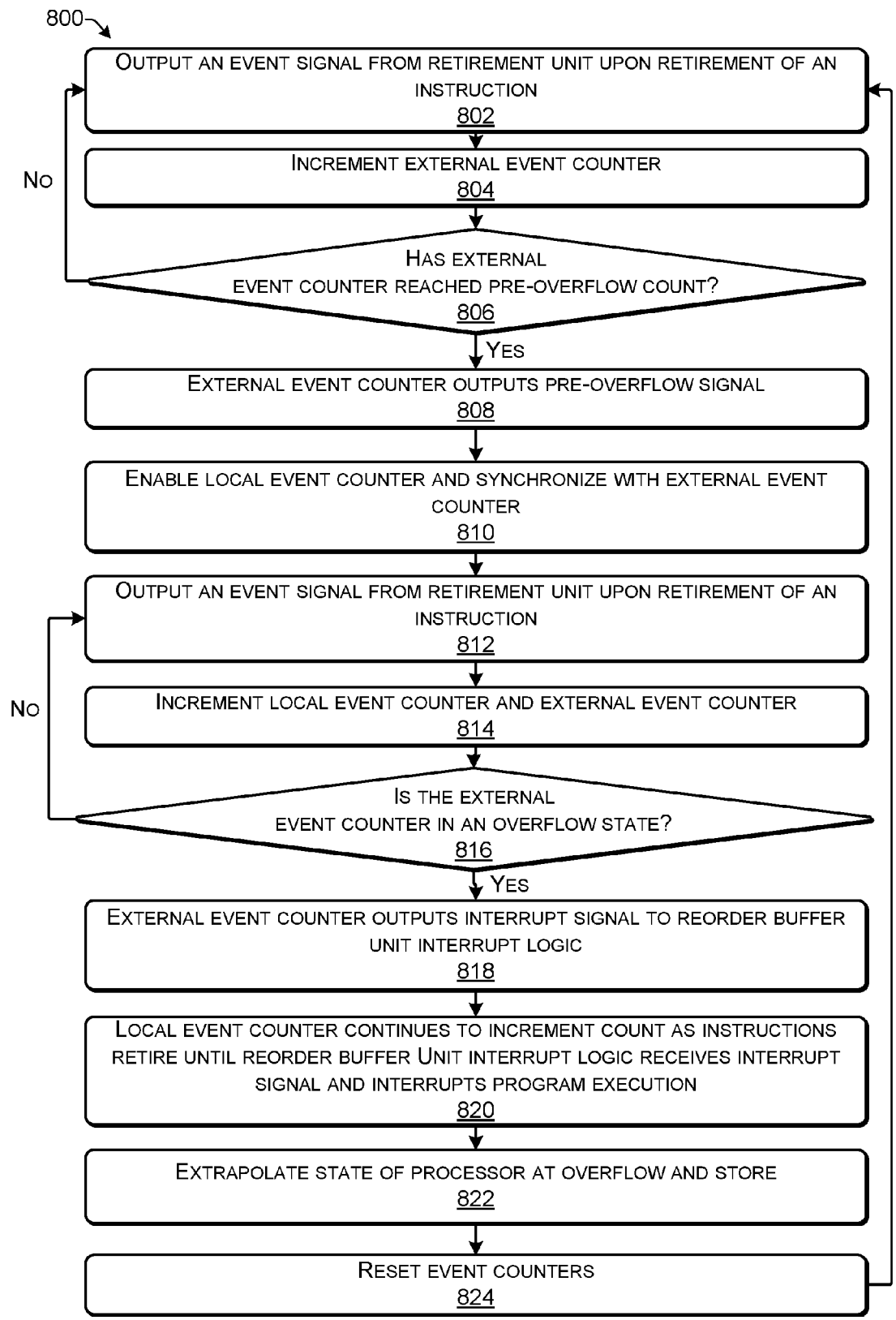
FIG. 8 illustrates an example process flow according to some implementations.

FIG. 8 illustrates an example flow diagram of an example process 800 for collecting state data of a processor according to some implementations. For discussion purposes, the process is described with reference to the processor 702 of FIG. 7, although the process 800 may be implemented using a wide variety of other processors, architectures, systems and environments.

At 802, when an instruction is retired 306, the retirement unit 308 outputs an event signal 134. At 804, the event counter 214 receives the event signal 134 and increments its event count 216. At 806, it is determined if the event counter 214 has reached a pre-overflow event count 126. If not, the process flow returns to 802. If the event counter 214 has reached a pre-overflow event count 126, at 808, the event counter 214 outputs a pre-overflow signal 136. At 810, in response to the pre-overflow signal 136, the local event counter 706 is enabled and synchronized with the event counter 214 such that the instruction retired event 306 that will result in the overflow of the event counter 214 will correspond to a defined local count value in the local event counter 706.

At 812, when an instruction is retired, the retirement unit 306 outputs an event signal 134. At 814, the event counter 214 and local event counter 706 receive the event signal 134 and increment their respective event counts 216 and 710. At 816, it is determined if the event counter 214 has overflowed. If not, the process flow returns to 812. If the event counter 214 has overflowed, at 818, event counter 214 outputs an interrupt signal 222 to reorder buffer unit interrupt logic 310.

At 820, the local event counter 706 continues to increment count 710 for each event signal 134 received until the reorder buffer unit interrupt logic 310 receives interrupt signal 222 and interrupts program execution. In response to the interrupt signal 222, reorder buffer unit interrupt logic 310 interrupts the execution of program instructions by the processor 702 and causes the execution of microcode instructions stored in microcode unit 212 that collect and store processor state information 712 of processor 702 at the time the program execution is interrupted. The stored processor state information may be a complete record of the state of the processor or may be a partial record that includes defined information such as an instruction pointer 220.

At 822, reorder buffer unit interrupt logic 310 causes the execution of microcode instructions stored in microcode unit 212 that extrapolate the state information of processor 702 at the time the instruction causing the overflow occurred based on the processor state information stored in processor state storage 708 and the count of the local event counter 706 at the time the execution is interrupted. The count of the local event counter 706 at the time the execution is interrupted can be used to determine how many instructions were retired after the instruction that caused the overflow event and before execution was interrupted. The extrapolated processor state information 714 is then stored. At 824, the event counters are reset and program execution resumes.

While several examples have been illustrated herein for discussion purposes, numerous other configurations may be used and thus implementations herein are not limited to any particular configuration or arrangement. For example, the discussion herein refers to signals being output and received by particular components of the processor. This should not be taken as a limitation as such communication need not be direct and the particular components need not necessarily be a single functional unit. For example, the discussion herein refers to interrupts being caused by an event counter. This is not to be taken as limiting implementations to only those in which the event counter directly causes the interrupt. The interrupt could instead be caused by a separate unit upon receipt of an indication that the event counter has overflowed.

The processes described herein are only examples provided for discussion purposes. Numerous other variations will be apparent to those of skill in the art in light of the disclosure herein. Further, while the disclosure herein sets forth several examples of suitable frameworks, architectures and environments for executing the techniques and processes herein, implementations herein are not limited to the particular examples shown and discussed.

The processes illustrated herein are shown as a collection of operations in a logical flow graph, which represents a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described is not intended to be construed as a limitation. Any number of the described blocks can be combined in any order and/or in parallel to implement the process, and not all of the blocks need be executed.

Example System Architecture

Figure 9:
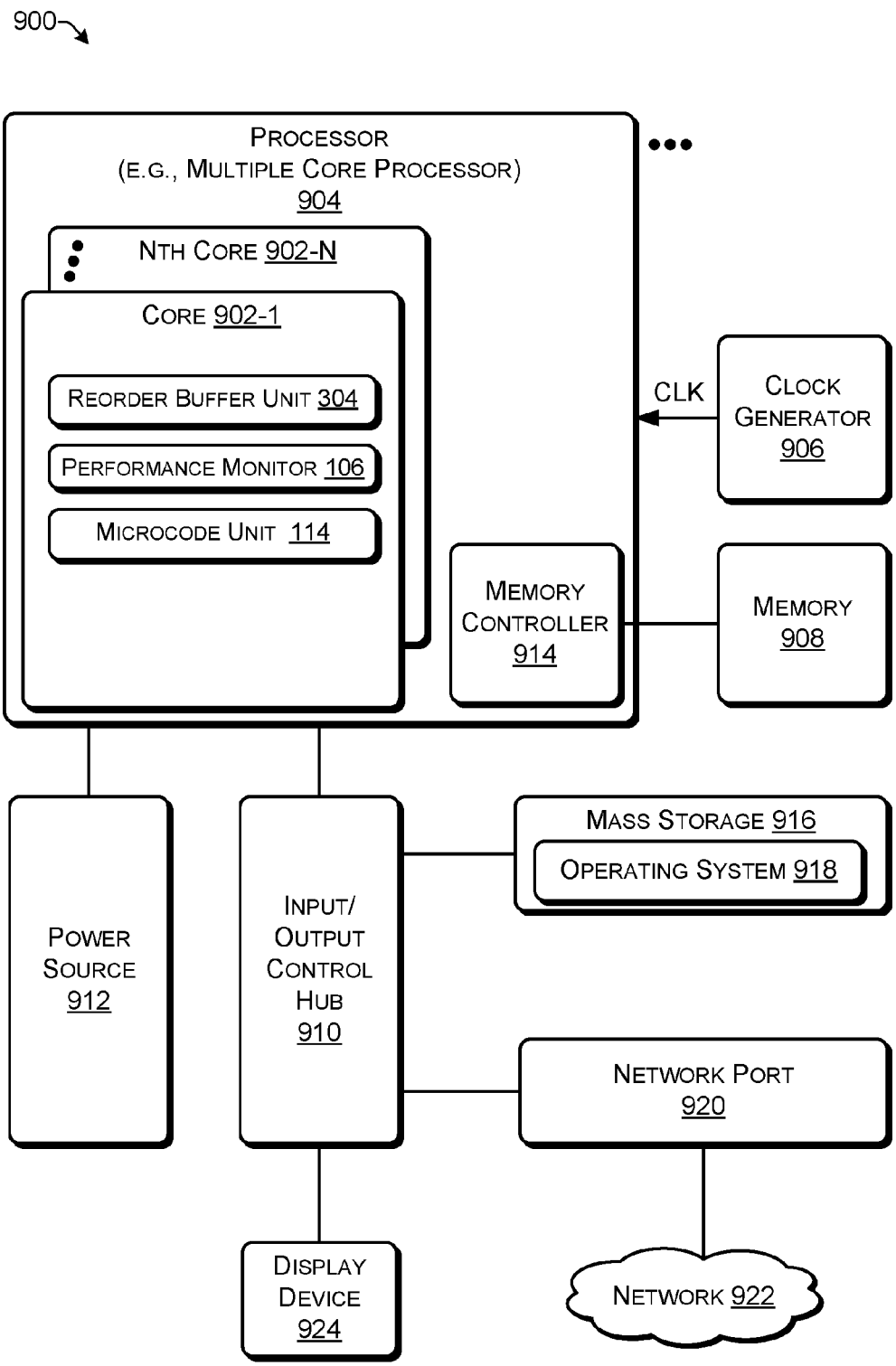
FIG. 9 illustrates an example system in which implementations may operate.

FIG. 9 illustrates select components of an example architecture of a system 900 as an example of an environment in which some implementations may operate. System 900 may encompass any of a variety of devices, such as a desktop computing device, a laptop computing device, tablet computing device, netbook computing device, wireless computing device, or a server computing device, as several non-limiting examples.

The system 900 may include one or more cores 902 in one or more processors, such as a processor 904, a clock generator 906, a memory 908 (e.g., random access memory (RAM)), an input/output control hub 910, and a power source 912 (e.g., a battery or a power supply). The processor 904 may include a single core 902-1 or multiple cores 902-1, ..., 902-N (where N is an integer >1), such as a first core 902-1 and one or more additional cores, up to and including an $N^{th}$ core 902-N. The processor 904 may include a memory controller 914 to enable access (e.g., reading from or writing) to the memory 908. In some embodiments, at least one of the N cores 902 may include a reorder buffer unit 304, a performance monitor 106 and a microcode unit 114 which may operate in a similar manner as described above regarding other example implementations, e.g. FIG. 3.

The clock generator 906 may generate a clock signal that is the basis for an operating frequency of one or more of the N cores 902 of the processor 904. For example, one or more of the N cores 902 may operate at a multiple of the clock signal generated by the clock generator 906.

The input/output control hub 910 may be coupled to a mass storage 916. The mass storage 916 may include one or more non-volatile storage devices, such as disk drives, solid state drives, and the like. An operating system 918 may be stored in the mass storage 916.

The input/output control hub 910 may be coupled to a network port 920. The network port 920 may enable the system 900 to communicate with other devices via a network 922. The network 922 may include multiple networks, such as wireline networks (e.g., public switched telephone network and the like), wireless networks (e.g., 802.11, code division multiple access (CDMA), global system for mobile (GSM), Long Term Evolution (LTE) and the like), other types of communication networks, or any combination thereof. The input/output control hub 910 may be coupled to a display device 924 that is capable of displaying text, graphics, and the like.

As described herein, the processor 904 may include multiple computing units or multiple cores. The processor 904 can be implemented as one or more microprocessors, microcomputers, microcontrollers, digital signal processors, central processing units, state machines, logic circuitries, and/or any devices that manipulate signals based on operational instructions. Among other capabilities, the processor 904 can be configured to fetch and execute computer-readable instructions stored in the memory 908 or other computer-readable media.

The memory 908 is an example of computer storage media for storing instructions which are executed by the processor 904 to perform the various functions described above. The memory 908 may generally include both volatile memory and non-volatile memory (e.g., RAM, ROM, or the like). The memory 908 may be referred to as memory or computer storage media herein, and may be a non-transitory media capable of storing computer-readable, processor-executable program instructions as computer program code that can be executed by the processor 904 as a particular machine configured for carrying out the operations and functions described in the implementations herein.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A processor comprising:
a functional unit to output a first signal in response to an occurrence of a type of event within the processor;
a first event counter to count occurrences of the type of event based on the first signal, the first event counter to output a pre-overflow signal in response to reaching a predefined pre-overflow count, and to generate an interrupt in response to reaching a predefined overflow count;
a second event counter to be activated in response to the pre-overflow signal, and to measure an interrupt response time comprising a number of occurrences of the type of event until execution is halted in response to the interrupt; and
an interrupt unit to, in response to the interrupt, halt execution and extrapolate an architectural state of the processor as of a time when the interrupt was generated using a current architectural state of the processor and the interrupt response time.

2. A processor as recited in claim 1, further comprising a reorder buffer unit that comprises the functional unit and the second event counter, wherein the functional unit is a retirement unit and the first event counter is external to the reorder buffer unit.

3. A processor as recited in claim 1, wherein the generated interrupt is to cause sampling and storage of an instruction pointer.

4. A processor as recited in claim 1, wherein the first event counter comprises a first number of bits, the second event counter comprises a second number of bits, and the first number of bits is greater than the second number of bits.

5. A processor as recited in claim 1, wherein the type of event is a retirement event.

6. A processor as recited in claim 1, wherein the type of event is an instruction retired event.

7. A processor as recited in claim 1, wherein the type of event is a branch retired event.

8. A processor as recited in claim 1, wherein the generated interrupt is to cause sampling and storage of at least a portion of an architectural state of the processor.

9. A system comprising:
a memory;
a processor coupled to the memory, the processor including:
a reorder buffer unit to output a first signal in response to an occurrence of a type of event within the processor;
a first event counter to count occurrences of the type of event based on the first signal, to generate a pre-overflow signal in response to reaching a predefined pre-overflow count, and to derive an interrupt in response to reaching a predefined overflow count;
a second event counter to be activated in response to the pre-overflow signal, and to measure an interrupt response time comprising a number of occurrences of the type of event until execution is halted in response to the interrupt; and an interrupt unit to, in response to the interrupt, halt execution and extrapolate an architectural state of the processor as of a time when the interrupt was generated using a current architectural state of the processor and the interrupt response time.

10. A system as recited in claim 9, wherein, in response to the generated interrupt, the processor is to sample and store an instruction pointer.

11. A system as recited in claim 10, further comprising micro-code to be executed to detect the instruction pointer to store.

12. A system as recited in claim 9, wherein the first event counter is external to the reorder buffer unit.

13. A system as recited in claim 9, wherein the type of event is a retirement event.

14. A system as recited in claim 9, wherein the type of event is an instruction retired event.

15. A system as recited in claim 9, wherein the type of event is a branch retired event.

16. A system as recited in claim 9, wherein, in response to the generated interrupt, the processor is to store at least a portion of an architectural state of the processor.

17. A method comprising:
outputting, by a functional unit of a processor, a first signal in response to an occurrence of a type of event within the processor;
counting, by a first event counter of a processor, occurrences of the type of event based on the first signal;
outputting, by the first event counter, a pre-overflow signal in response to reaching a predefined pre-overflow count;
generating an interrupt by the first event counter in response to reaching a predefined overflow count;
activating a second event counter in response to the pre-overflow signal, and counting, by the second event counter, an interrupt response time comprising a number of occurrences of the type of event until execution is halted in response to the interrupt; and
halting execution in response to the interrupt and extrapolating an architectural state of the processor as of a time when the interrupt was generated using a current architectural state of the processor and the interrupt response time.

18. A method as recited in claim 17, further comprising sampling an instruction pointer in response to the interrupt.

19. A method as recited in claim 17, wherein the predefined pre-overflow count is represented by a greater number of bits than the predefined overflow count.

20. A method as recited in claim 17, wherein the type of event is a retirement event and a reorder buffer unit comprises the second event counter.

* * * * *